(12) United States Patent
Chan et al.

(10) Patent No.: US 7,025,874 B2
(45) Date of Patent: Apr. 11, 2006

(54) NOZZLE/MIXER ASSEMBLY

(75) Inventors: Edward W. Chan, Edmonton (CA);
Steven McDougall, Edmonton (CA);
Brian Knapper, Edmonton (CA)

(73) Assignees: Ace oil Sands, L.P., Calgary (CA);
Canadian Oil Sands Commerical Trust, Calgary (CA); Canadian Oil Sands Limited, Calgary (CA);
ConocoPhillips Oilsands Partnership II, Calgary (CA); Imperial Oil Resources, Calgary (CA); Mocal Energy Limited, Tokyo (JP); Murphy Oil Company Ltd.,, Calgary (CA);
Nexen Inc.,, Calgary (CA);
Petro-Canada Oil and Gas, Calgary (CA)

( * ) Notice: Subject to any disclaimer, the term of this patent is extended or adjusted under 35 U.S.C. 154(b) by 546 days.

(21) Appl. No.: 10/264,262

(22) Filed: Oct. 4, 2002

(65) Prior Publication Data
US 2004/0065590 A1    Apr. 8, 2004

(51) Int. Cl.
*C10G 9/32* (2006.01)
*B01J 8/18* (2006.01)

(52) U.S. Cl. .................. 208/158; 208/153; 208/157; 208/146; 422/139; 422/143

(58) Field of Classification Search .......... 208/158, 208/153, 157, 146; 422/139, 143
See application file for complete search history.

(56) References Cited

U.S. PATENT DOCUMENTS

| | | | |
|---|---|---|---|
| 2,709,675 A * | 5/1955 | Phinney | 201/31 |
| 2,786,801 A | 3/1957 | McKinley et al. | |
| 2,832,545 A * | 4/1958 | Segraves | 208/127 |
| 2,872,411 A * | 2/1959 | Krebs et al. | 208/157 |
| 2,874,095 A * | 2/1959 | Boisture et al. | 208/127 |
| 2,885,272 A * | 5/1959 | Kimberlin et al. | 208/127 |
| 2,953,517 A | 9/1960 | Whiteley et al. | |
| 3,354,863 A * | 11/1967 | Reynolds | 118/62 |
| 3,374,168 A * | 3/1968 | Metrailer | 208/127 |
| 3,565,593 A | 2/1971 | Moore, Jr. | |
| 4,097,366 A | 6/1978 | Tanaka et al. | |
| 4,578,183 A * | 3/1986 | Chou et al. | 208/113 |
| 5,108,583 A | 4/1992 | Keon | |
| 5,552,119 A | 9/1996 | Holmes | |
| 5,979,799 A | 11/1999 | Chen et al. | |
| 6,003,789 A | 12/1999 | Base et al. | |

* cited by examiner

*Primary Examiner*—Walter D. Griffin
(74) *Attorney, Agent, or Firm*—Millen, White, Zelano, Branigan, P.C.

(57) ABSTRACT

A bitumen/steam pre-mixer and atomizing nozzle combine to produce a jet of minute liquid droplets (bitumen) in carrier gas (steam). The jet is injected into a draft tube mixer positioned in a fluid bed of hot coke particles suspended in steam and contained within a fluid coking reactor. The movement of the jet through the draft tube passageway induces a stream of coke particles in steam to be drawn into the passageway, where the jet and stream mix vigorously and bitumen droplets have an enhanced probability of contacting coke particles.

15 Claims, 5 Drawing Sheets

NOZZLE/MIXER ASSEMBLY

FIELD OF THE INVENTION

The invention relates to a method and nozzle/mixer assembly for mixing a jet of atomized liquid droplets suspended in carrier gas with an entrained stream of fluidizing gas carrying solid particles, so that the droplets have opportunity to contact the particles.

The assembly and method are particularly useful for mixing a stream of hot coke particles and fluidizing gas, drawn from a fluidized bed in a fluid coking reactor, with a jet of atomized oil droplets and carrier gas being injected into the fluidized bed.

BACKGROUND OF THE INVENTION

The invention was developed in connection with a research program dedicated to increasing the proportion of hot coke particles, present in a fluid coking reactor, which are contacted by atomized oil or bitumen droplets injected into the fluid bed. The invention will be described in that particular context. However it is contemplated that the invention will be useful in other applications (such as fluid catalyst cracking, steam stripping, particle coating and the like) where it is desired to enhance contact between injected atomized liquid droplets and gas-fluidized particles.

The words 'oil' and 'bitumen' are used interchangeably in this specification. Bitumen is a specie of oil.

A fluid coker at any particular moment typically may contain a column or fluid bed of about 700 tons of hot coke particles passing therethrough. Steam is injected at the base of the reactor, to maintain the hot coke particles in a fluidized state.

Bitumen or oil is injected into the bed in the form of sprays or jets of fine droplets carried by a carrier gas, such as steam. These are very fast-moving jets of very fine droplets. In U.S. Pat. No. 6,003,789, the present assignees disclosed a steam/bitumen pre-mixer and atomizing nozzle which is capable of producing jets comprising droplets of bitumen having a size in the order of 300 microns, carried in steam and moving at a velocity in the order of 300 fsp. The nozzle is mounted to the side wall of the fluid coker, so that it extends through the wall into the contained fluid bed.

In conformance with conventional industry belief, we initially assumed that fine liquid droplets, delivered in a jet produced by such a pre-mixer and nozzle assembly, would be well mixed with coke particles present in a turbulent fluidized bed. It was assumed that individual droplets would contact and adhere to individual hot coke particles and heat transfer would very quickly convert the oil to gas-make and coke.

However, it was noted that agglomerates of oil-wet particles were being formed. They would drop within the reactor chamber and foul the reactor internals at the base of the chamber. This had been a long standing problem associated with fluid coking operations. It became apparent that the high velocity jet of minute oil droplets, supplied by the aforesaid pre-mixer and nozzle assembly, did not eliminate the problem.

These facts suggested to us that some hot coke particles were being coated with too thick a coating of oil, creating a mass transfer limitation. The oil on the particle would fail to sufficiently rapidly convert to hydrocarbon vapor and coke. The wet particles would contact and adhere together to produce the relatively heavy agglomerates, which would fall down through the bed.

We questioned whether the oil droplets were being well mixed with a sufficiently large number of hot coke particles. Our research therefore turned toward investigating the nature of mixing that was actually involved.

Our experimental work indicated:

that there is a primary dispersion zone immediately adjacent the nozzle outlet, wherein the entering jet penetrates into the fluid bed and, due to its momentum, vigorously mixes with a small volume of the bed, creating the initial section of a "plume". Contact between some droplets and particles ensues in this initial plume section. The plume, now comprised of oil-wet particles and droplets in a matrix of carrier and fluidizing gas, extends out into the main portion of the fluid bed, which we refer to as the secondary dispersion zone. The residence time in the primary dispersion zone is very short—in the order of milliseconds. The residence time in the secondary dispersion zone is much greater, perhaps in the order of several minutes. The oil coatings on the hot coke particles convert to volatized liquid product, gas-make and coke over time, primarily in the secondary dispersion zone;

that oil-wet agglomerates appear at the end of the plume and then tend to drop to the bottom of the reactor;

that the mixing of oil droplets with hot coke particles in the secondary dispersion zone is relatively ineffective. We believe that only about 20–30% of the coke particles in the reactor are contacted by the liquid feed; and that the jet issuing from the nozzle outlet is compressed significantly by the fluid bed. If the jet is discharged into open air, it will produce a plume perhaps 30 feet in length. However the plume produced in the fluid bed is short and somewhat L-shaped, as illustrated in FIG. 1. The plume might only have a length in the order of 3–4 feet. Otherwise stated, the fluid bed affects the plume by collapsing it.

These observations led to the conclusion that it would be desirable to increase the proportion of hot coke particles that experience vigorous mixing and exposure to oil droplets in the primary dispersion zone. The present invention is dedicated to that end.

SUMMARY OF THE INVENTION

In accordance with the invention a nozzle/mixer assembly is provided to project into a column of solid particles fluidized by gas.

The assembly comprises an atomizing nozzle extending through the side wall containing the column. This atomizing nozzle is operative to inject a jet of atomized liquid droplets in carrier gas. Preferably the atomizing nozzle forms the downstream end of a pre-mixer/nozzle assembly.

The assembly further comprises a mixer forming an open-ended passageway communicating at its inlet end with the outlet of the nozzle. Preferably the mixer comprises a draft tube, more preferably a venturi tube. The mixer serves to temporarily confine the jet passing therethrough.

The mixer and jet combine to create a low pressure condition that draws a stream of solid particles and fluidizing gas into the passageway from the column. The entrained stream and jet momentarily mix vigorously as they pass together through the confined passageway.

As a consequence of combining the nozzle, mixer, jet and column in the manner described, the invention is characterized by the following:

the momentum of the jet is utilized to draw solids into the mixer and to induce intense mixing of the solids and liquid in the mixer; and the probability of individual droplets and particles contacting is thereby enhanced.

In the particular and preferred case of using the assembly with a fluid coking reactor, the following benefits can be expected:

more coke particles may be thinly coated with oil, leading to improvement in liquid yield;

the production of agglomerates can be curtailed, leading to a reduction in fouling; and the reactor operating temperature can be reduced while still achieving high liquid product yield by reducing the mass transfer limitation on the liquid vaporization process.

In one embodiment, the invention comprises a nozzle/mixer assembly for producing a jet, comprising atomized liquid droplets and carrier gas, and mixing it with a stream of particulate solids and fluidizing gas drawn from a fluidized column enclosed in a tubular side wall, comprising: an atomizing nozzle for producing the jet, said nozzle extending through the side wall and having an outlet for delivering the jet into the column; a mixer positioned within the column and forming an open-ended confining passageway; the nozzle outlet being aligned with the passageway so that the jet will move through the passageway and draw a stream of solids and fluidizing gas from the column into the passageway, whereby entrained solids and liquid droplets may mix and contact therein.

In another embodiment, the invention comprises a method for mixing and contacting particulate solids, carried in fluidizing gas as a column enclosed in a tubular side wall, with atomized liquid droplets associated with carrier gas in the form of a jet, said jet being injected into the column through an atomizing nozzle extending through the side wall and having an outlet, comprising: providing means forming an open-ended tubular passageway positioned within the column and having inlet means communicating with the nozzle outlet; injecting the jet into the passageway so that it passes therethrough on its way into the column; drawing a stream of solids and fluidizing gas from the column into the passageway through the inlet means; and temporarily confining the jet and the stream together in the passageway as they pass therethrough, so that droplets and solids mix and contact therein.

DESCRIPTION OF THE PREFERRED EMBODIMENT

Figure 8:
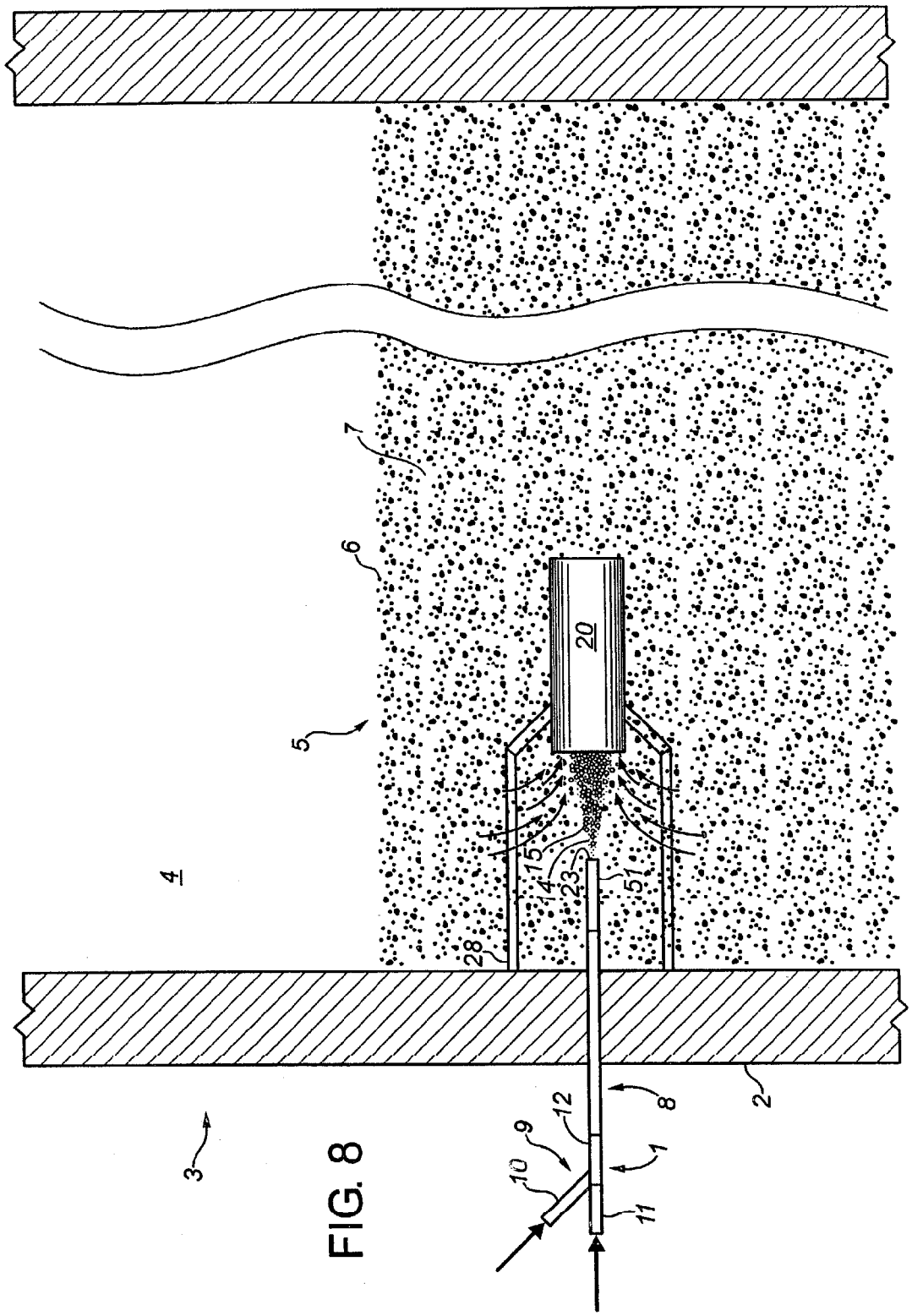
FIG. 8 is a sectional side view of the best mode embodiment of the assembly.

Having reference to FIG. 8, a nozzle/mixer assembly 1 is mounted to the tubular side wall 2 of a fluid coking reactor 3. The reactor 3 has an interior chamber 4 containing a fluidized column or bed 5 of hot coke particles 6 suspended in fluidizing steam bubbles 7.

Figure 1:
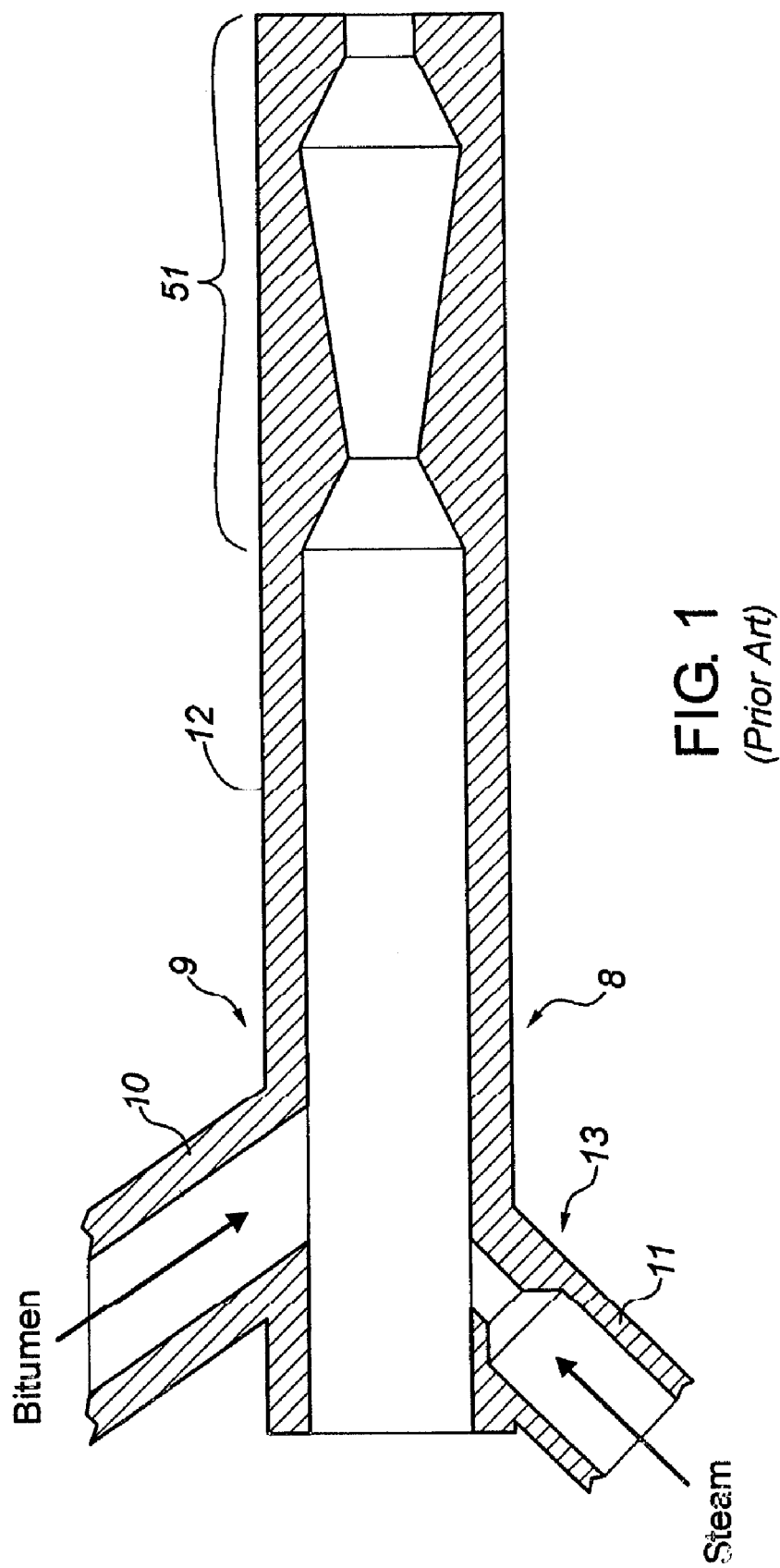
FIG. 1 is a sectional side view of a prior art pre-mixer and atomizing nozzle assembly for producing a jet of liquid droplets in carrier gas.
Figure 2:
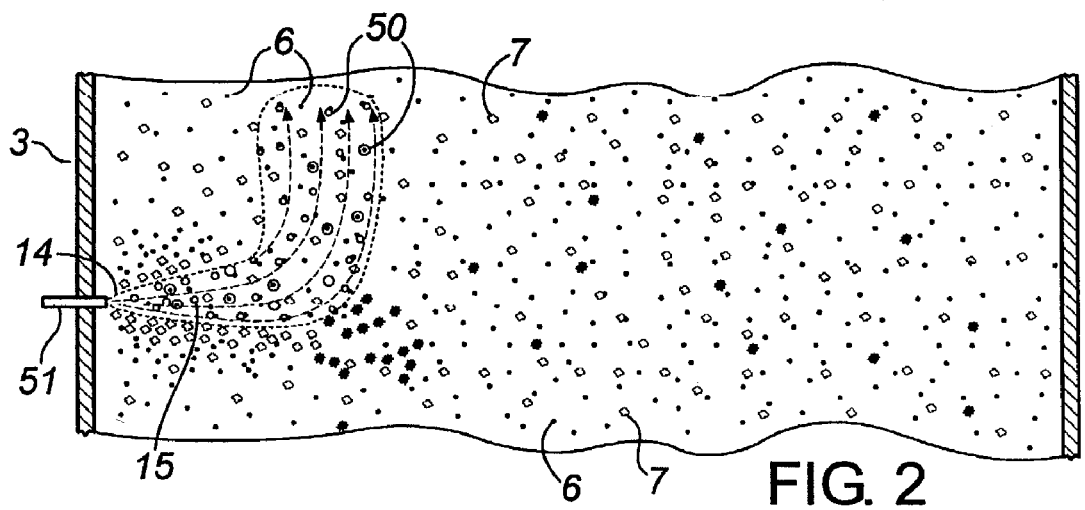
FIG. 2 is a simplified side elevation showing a prior art assembly involving an atomizing nozzle extending through one side wall of a tubular reactor containing a fluidized bed of solid particles in the form of a column—the figure includes a conceptual representation showing the elements of the fluid bed, the injected jet and the produced plume.

Having reference to FIGS. 1, 2 and 8, the nozzle/mixer assembly 1 comprises a pre-mixer and an atomizing nozzle assembly 8 extending through the reactor side wall 2 into the chamber 4. The atomizing nozzle 51 may be such as shown in U.S. Pat. No. 6,003,789. The atomizing nozzle 51 is the end piece on a pre-mixer 9. The pre-mixer 9 comprises intersecting pipes 10, 11 supplying bitumen and steam, respectively, under pressure to a nozzle feed pipe 12. An orifice mixing nozzle 13 is mounted in the pipe 11. The bitumen/steam mixture is discharged through the constrictive atomizing nozzle 51 in the form of a high velocity jet 14 of atomized bitumen droplets 15 dispersed in carrier gas 16 (i.e. the steam).

Figure 3:
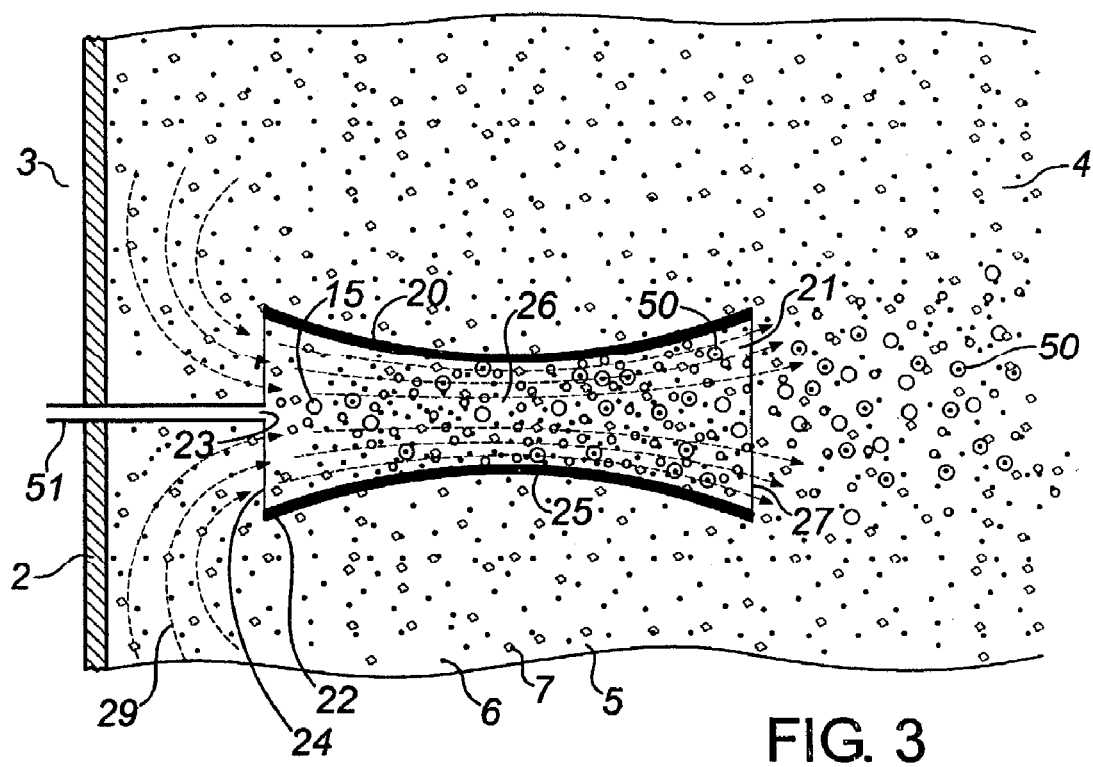
FIG. 3 is a simplified side elevation showing, in accordance with the invention, an atomizing nozzle and reactor as per FIG. 1 but with a cylindrical venturi tube positioned within the bed and aligned with the nozzle—the figure includes a conceptual representation showing the elements of the fluid bed, the injected jet, the entrained stream and the produced plume.

Having reference to FIG. 3, a draft tube 20, forming an open-ended interior venturi passageway 21, is positioned within the fluid bed 5. The inlet end 22 of the draft tube 20 is aligned with and extends around the outlet 23 of the atomizing nozzle 51, so that the jet 14 is discharged into the passageway 21. As shown, the draft tube 20 of FIG. 3 has relatively wide inlet 24 and its side wall 25 tapers inwardly to form a constrictive section 26 which then tapers outwardly to an outlet 27.

As shown in FIG. 8, the draft tube 20 is mounted within the reactor chamber 4 by brackets 28.

In operation, the jet 14 moving through the draft tube 20 creates a low pressure condition within the passageway 21, which acts to draw a stream 29 of coke particles 6 and fluidizing gas 7 into the tube inlet 24. The jet 14 and entrained stream 29 may be accelerated and mix vigorously as they move together through the passageway 21. This provides an enhanced opportunity for bitumen droplets 15 and coke particles 6 to contact and form bitumen/coke composites 50. The mixture is then discharged into the fluid bed 5.

Figure 4:
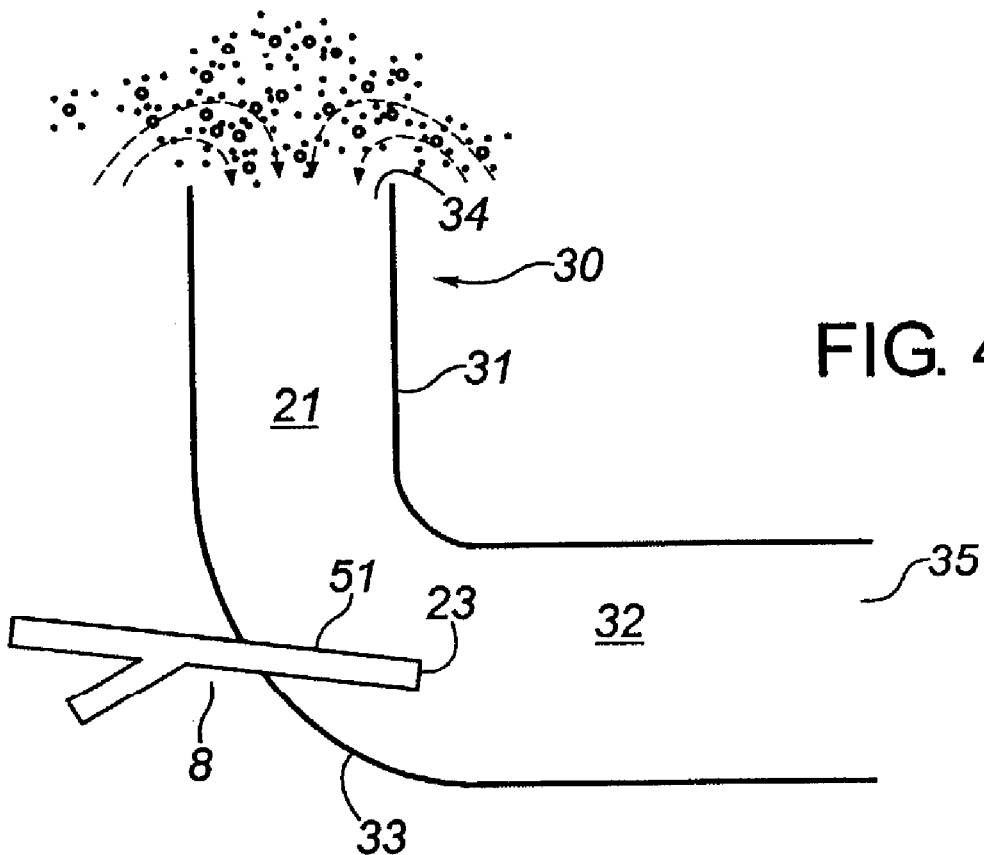
FIG. 4 is a simplified schematic in side view showing a pre-mixer and atomizing nozzle combined with and feeding an L-shaped tube, with arrows indicating the entrained stream.

The alternative embodiment shown in FIG. 4 involves an L-shaped tube 30 having a side wall 31 through which the atomizing nozzle 51 extends at the bend 33 to communicate with the downstream section 32 of the internal passageway 21. In operation the jet 14 functions to create a low pressure condition within the passageway 21 which draws a stream 29 of coke particles 6 and fluidizing gas 7 from the fluid bed 5 through the tube inlet 34 into the passageway 21. The entrained stream 29 and jet 14 then mix vigorously in the downstream section 32 of the passageway, before being emitted through the tube outlet 35 into the bed 5.

Figure 5:
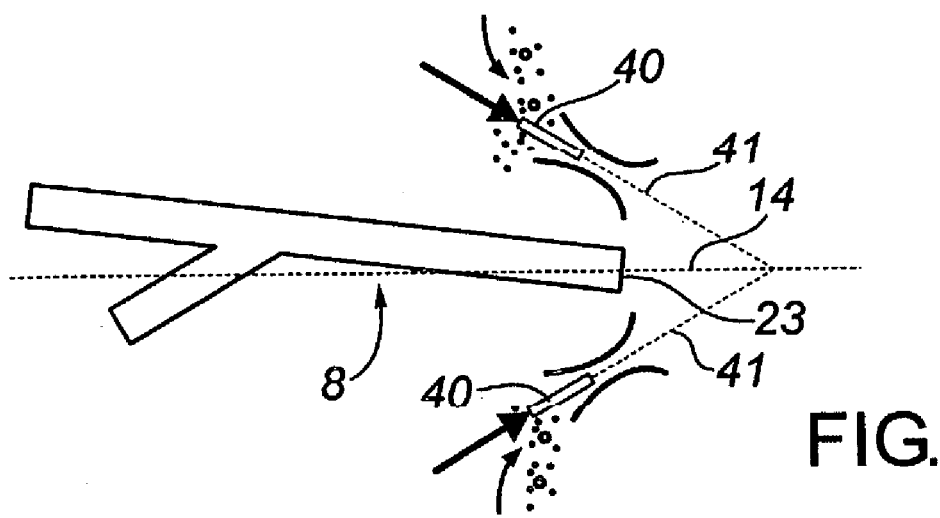
FIG. 5 is a simplified schematic in side view showing a pre-mixer and atomizing nozzle combined with a ring of angled nozzles, each injecting a steam jet through a venturi tube to entrain particulate solids and gas from the bed and direct the resulting streams into the jet of the atomizing nozzle.
Figure 6:
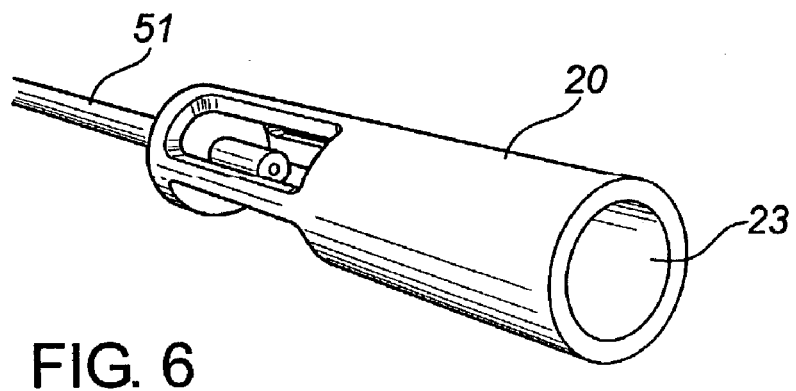
FIG. 6 is a perspective view of one embodiment of a draft tube and nozzle.
Figure 7:
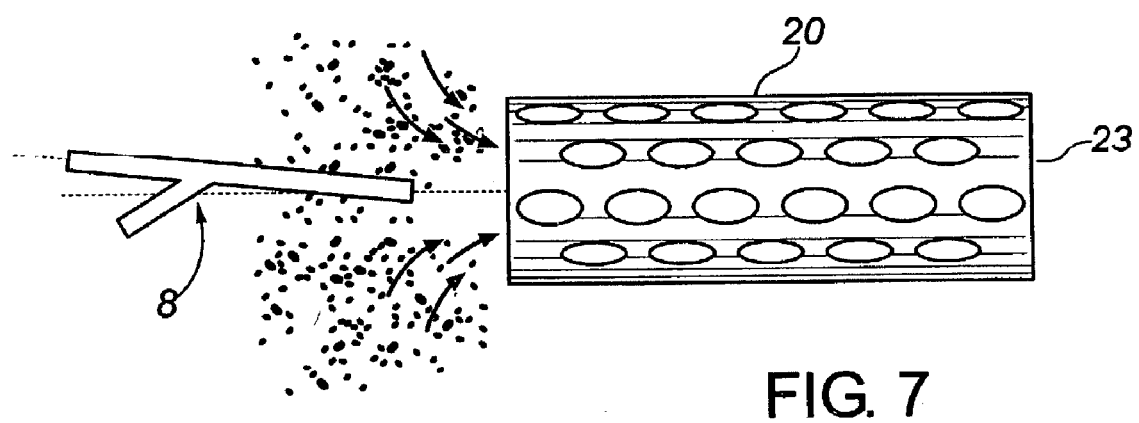
FIG. 7 is a side view showing another embodiment of draft tube coupled to a pre-mix and atomizing nozzle assembly.

In another alternative embodiment shown in FIG. 5, one or more angled nozzles 40 are positioned around and immediately downstream of the atomizing nozzle outlet 23. The nozzles 40 emit jets 41 of steam which penetrate into and mix with the atomizing nozzle jet 14, to produce a mixture that then disperses into the fluid bed 5. The jets 41 in effect create a confining passageway in which mixing may take place.

The preceding examples can be repeated with similar success by substituting the generically or specifically described reactants and/or operating conditions of this invention for those used in the preceding examples.

The entire disclosure of all applications, patents and publications, cited above and below is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A nozzle/mixer assembly for producing a jet comprising atomized liquid droplets and carrier gas and mixing it with a stream of particulate solids and fluidizing gas from a fluidized column enclosed in a tubular side wall, comprising:
   a tubular enclosure for a fluidized column having a vertical tubular side wall,
   an atomizing nozzle for producing the jet, said nozzle extending essentially horizontally through the side wall and having an outlet within the tubular enclosure;
   a mixer positioned essentially horizontally within the tubular enclosure and forming an open-ended confining passageway;
   the nozzle outlet being aligned with the open-ended confining passageway of the mixer so that the jet will move through the passageway and, when the tubular enclosure contains a fluidized column, will draw a stream of solids and fluidizing gas from the column into the passageway, whereby entrained solids and liquid droplets may mix and contact therein.

2. The nozzle/mixer assembly as set forth in claim 1 wherein:
   the mixer is a draft tube.

3. The nozzle/mixer assembly as set forth in claim 2 wherein:
   the draft tube has a venturi section operative to promote a low pressure condition within the passageway.

4. The nozzle/mixer assembly as set forth in claim 3, wherein:
   the fluidized column is a fluid bed and the tubular enclosure is that of a fluid coking reactor.

5. The nozzle/mixer assembly as set forth in claim 3, wherein:
   the tubular enclosure for a fluidized column is that of a fluid coking reactor;
   the jet comprises atomized oil droplets carried by steam; and
   the fluidized column comprises hot coke particles suspended in steam.

6. The nozzle/mixer assembly as set forth in claim 2, wherein:
   the fluidized column is a fluid bed and the tubular enclosure is that of a fluid coking reactor.

7. The nozzle/mixer assembly as set forth in claim 2, wherein the tubular enclosure for a fluidized column is that of a fluid coking reactor;
   the jet comprises atomized oil droplets carried by steam; and
   the fluidized column comprises hot coke particles suspended in steam.

8. The nozzle/mixer assembly as set forth in claim 1, wherein:
   the fluidized column is a fluid bed and the tubular enclosure is that of a fluid coking reactor.

9. The nozzle/mixer assembly as set forth in claim 1, wherein:
   the tubular enclosure for a fluidized column is that of a fluid coking reactor;
   the jet comprises atomized oil droplets carried by steam; and
   the fluidized column comprises hot coke particles suspended in steam.

10. A method for mixing and contacting particulate solids, carried in fluidizing gas as a column enclosed in a tubular side wall, with atomized liquid droplets carried in a carrier gas in the form of a jet, the jet being injected into the column through an atomizing nozzle extending essentially horizontally through the side wall and having an outlet, comprising:
    providing means forming an open-ended tubular passageway positioned essentially horizontally within the column and having inlet means communicating with the nozzle outlet;
    injecting the jet into the passageway so that it passes therethrough in the column;
    thereby drawing a stream of solids and fluidizing gas from the column into the passageway through the inlet means; and
    temporarily confining the jet and the stream together in the passageway as they pass therethrough, so that droplets and solids mix and contact therein.

11. The method as set forth in claim 10 wherein the means forming the passageway is a draft tube.

12. The method as set forth in claim 11 wherein the draft tube forming the passageway has a venturi section.

13. The method as set forth in claim 12, wherein:
    the side wall is that of a fluid coking reactor;
    the particulate solids are hot coke particles;
    the carrier gas is steam;
    the atomized liquid droplets are oil; and
    the fluidizing gas is steam.

14. The method as set forth in claim 11, wherein:
    the side wall is that of a fluid coking reactor;
    the particulate solids are hot coke particles;
    the carrier gas is steam;
    the atomized liquid droplets are oil; and
    the fluidizing gas is steam.

15. The method as set forth in claim 10, wherein:
    the side wall is that of a fluid coking reactor;
    the particulate solids are hot coke particles;
    the carrier gas is steam;
    the atomized liquid droplets are oil; and
    the fluidizing gas is steam.

* * * * *

UNITED STATES PATENT AND TRADEMARK OFFICE
CERTIFICATE OF CORRECTION

PATENT NO.        : 7,025,874 B2
APPLICATION NO.   : 10/264262
DATED             : April 11, 2006
INVENTOR(S)       : Edward W. Chan et al.

It is certified that error appears in the above-identified patent and that said Letters Patent is hereby corrected as shown below:

On the front page, Assignees: line 1, read "Ace oil Sands," should read -- AEC Oil Sands, --

Signed and Sealed this

Thirty-first Day of October, 2006

JON W. DUDAS
*Director of the United States Patent and Trademark Office*